US010704729B2

(12) United States Patent
Furlong

(10) Patent No.: US 10,704,729 B2
(45) Date of Patent: Jul. 7, 2020

(54) RIGID FOAM INSULATION HAVING A TONGUE-AND-GROOVE COUPLING

(71) Applicant: 1857993 Alberta Ltd, Calgary (CA)

(72) Inventor: Mitchell Furlong, Calgary (CA)

(*) Notice: Subject to any disclaimer, the term of this patent is extended or adjusted under 35 U.S.C. 154(b) by 15 days.

(21) Appl. No.: 16/119,214

(22) Filed: Aug. 31, 2018

(65) Prior Publication Data

US 2020/0072406 A1 Mar. 5, 2020

(51) Int. Cl.
*F16L 59/02* (2006.01)
*F16L 59/14* (2006.01)

(52) U.S. Cl.
CPC .......... *F16L 59/024* (2013.01); *F16L 59/028* (2013.01); *F16L 59/14* (2013.01); *F16L 59/021* (2013.01)

(58) Field of Classification Search
CPC ....... F16L 59/14; F16L 59/024; F16L 59/028; B29C 41/003; B65D 81/38
USPC ................................. 138/151, 156, 157, 162
See application file for complete search history.

(56) References Cited

U.S. PATENT DOCUMENTS

| | | | | |
|---|---|---|---|---|
| 3,095,337 A * | 6/1963 | Chase | ..................... | F16L 59/14 138/155 |
| 3,126,035 A * | 3/1964 | Espetvedt | ............. | F16L 59/024 138/162 |
| 4,287,245 A * | 9/1981 | Kikuchi | ................. | F16L 59/024 138/141 |
| 4,298,554 A * | 11/1981 | Vogel | ....................... | C04B 28/26 106/38.3 |
| 4,576,846 A * | 3/1986 | Noel | ........................ | B29C 65/58 428/36.5 |
| 5,006,185 A * | 4/1991 | Anthony | ................ | F16L 59/023 138/151 |
| 5,007,666 A * | 4/1991 | Kyfes | ...................... | B29C 65/58 138/162 |
| 5,934,337 A * | 8/1999 | Fiala | ....................... | F16L 59/023 138/149 |
| 6,247,500 B1 * | 6/2001 | McMahon | ................ | F16L 9/22 138/157 |
| 6,403,182 B1 * | 6/2002 | Plummer | ................... | B32B 1/08 138/151 |
| 9,157,565 B2 * | 10/2015 | Zettell | .................... | F16L 59/023 |
| 9,482,381 B1 * | 11/2016 | Hjelt | ....................... | B65D 81/38 |
| 2015/0114510 A1 * | 4/2015 | Zettell | .................... | F16L 59/023 138/149 |

* cited by examiner

*Primary Examiner* — Patrick F Brinson
(74) *Attorney, Agent, or Firm* — Lewellyn Law, PLLC; Stephen Lewellyn

(57) ABSTRACT

An insulating member comprises a body of rigid foam material having a first connecting edge surface and a second connecting edge surface, a groove formed into the rigid foam material of the body along the first connecting edge surface, and a tongue formed from the rigid foam material of the body along the second connecting edge surface. The groove, when viewed in a transverse cross-section, tapers from narrow to wide in a direction extending from its opening and into the body. The tongue, when viewed in a transverse cross-section, tapers from wide to narrow in a direction toward the second connecting edge surface. The tongue is bifurcated along its length into first and second ridges by a wedge-shaped void. A polymer coating of polyurea or polyurethane substantially covers the tongue and structurally reinforces the tongue allowing the first and second ridges to flex toward one another without breaking.

12 Claims, 4 Drawing Sheets

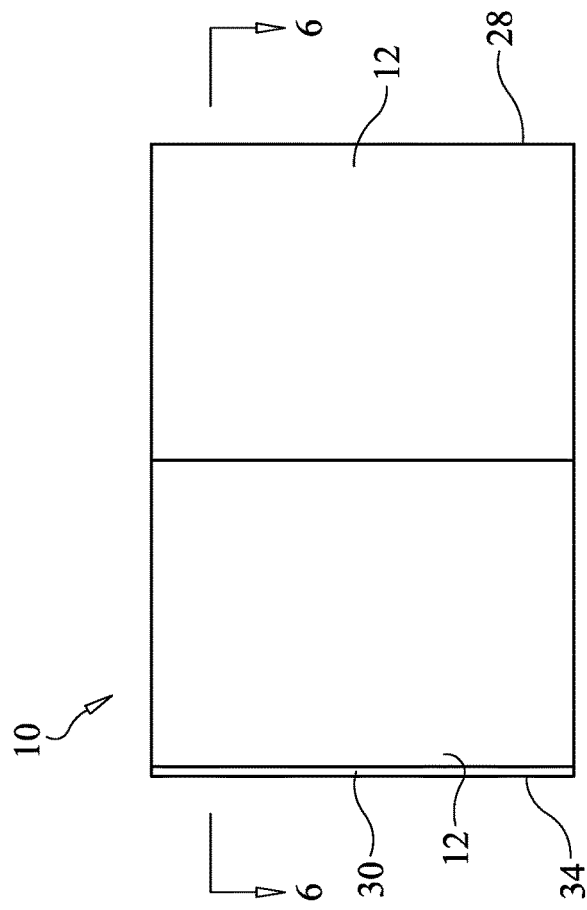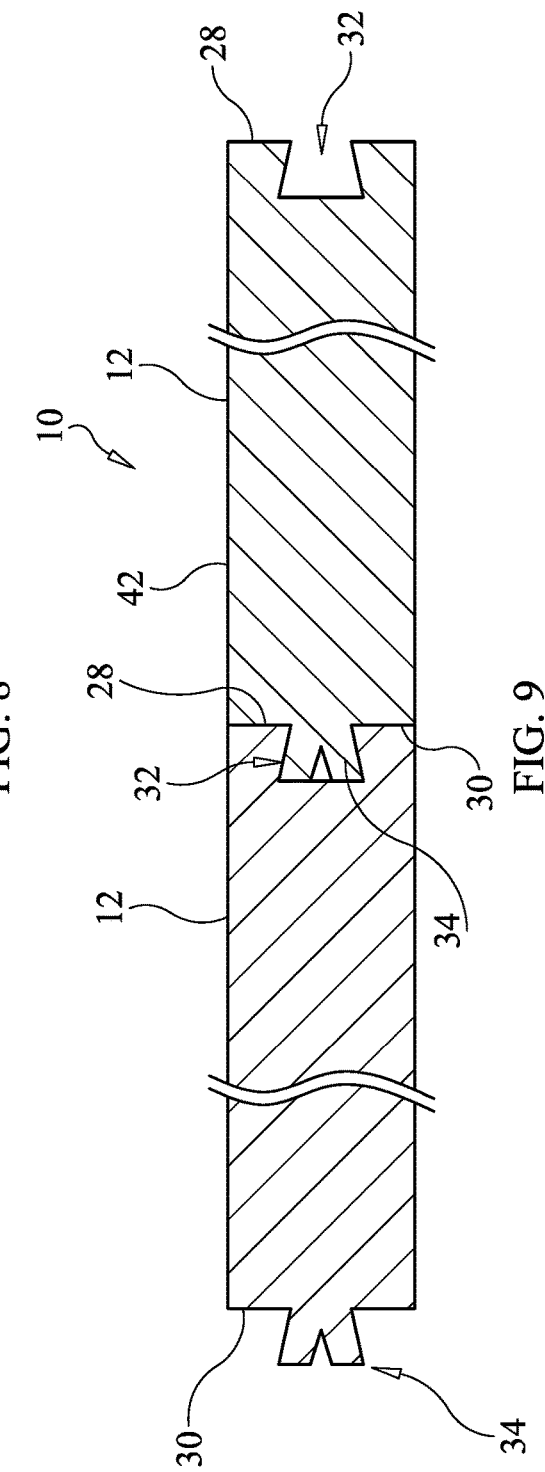

RIGID FOAM INSULATION HAVING A TONGUE-AND-GROOVE COUPLING

FIELD OF THE INVENTION

The present invention relates to insulation, and more particularly to rigid foam insulation having a tongue-and-grove coupling for removably connecting sections of insulation together.

BACKGROUND OF THE INVENTION

Insulation made of rigid foam material is known in the art and is used for covering pipe or conduits that carry product in very low temperatures, for example. Conventionally, the foam insulation comprises a pair of half-shell sections that when connected define a passage through which the pipe or is disposed. These conventional half-shells are placed around the pipe and permanently held together, in place by banding or similar method. However, the sections are difficult to hold together about the pipe for banding. Thus, before banding, the shells are often held together by glue, ties, tape, etc. so that the banding or the like can be applied without the shells becoming displaced. Temporarily securing the shells for banding is time consuming and requires additional material. Accordingly, there is a need and desire for a rigid foam insulation that can be placed about piping and secured in place for banding without having to use glue, ties, tape, etc.

SUMMARY OF THE INVENTION

According to an exemplary embodiment, an insulating member comprises a body of rigid foam material having a first connecting edge surface and a second connecting edge surface. The body further has a groove formed into the rigid foam material of the body along the first connecting edge surface. The groove, when viewed in a transverse cross-section, tapers from narrow to wide in a direction extending from its opening and into the body. The body further has a tongue formed from the rigid foam material of the body along the second connecting edge surface. The tongue, when viewed in a transverse cross-section, tapers from wide to narrow in a direction toward the second connecting edge surface. The tongue is bifurcated along its length into first and second ridges by a wedge-shaped void. A polymer coating of polyurea or polyurethane substantially covers the tongue and structurally reinforces the tongue allowing the first and second ridges to flex toward one another without breaking, which would otherwise break when flexed toward one another without the polymer coating.

There has thus been outlined, rather broadly, the more notable features of the invention in order that the detailed description thereof that follows may be better understood and in order that the present contribution to the art may be better appreciated.

Numerous objects, features and advantages of the present invention will be apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in several ways. Also, should be understood that the phraseology and terminology employed herein are for descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The drawings illustrate one or more embodiments the invention for illustrative discussion of the invention. No attempt is made to show structural details of the embodiments in more detail than is necessary for an understanding of the invention. The description taken with the drawings, making apparent to those skilled in the art how the several forms of the invention may be embodied in practice. Identical reference numerals do not necessarily indicate an identical structure. Rather, the same reference numeral may be used to indicate a similar feature or a feature with similar functionality. In the drawings:

FIG. 8 is a front view of insulation in accordance with an embodiment of the invention; and FIG. 9 is a cross-sectional view taken along line 6-6 in FIG. 5.

DETAILED DESCRIPTION OF THE INVENTION

Figure 1:
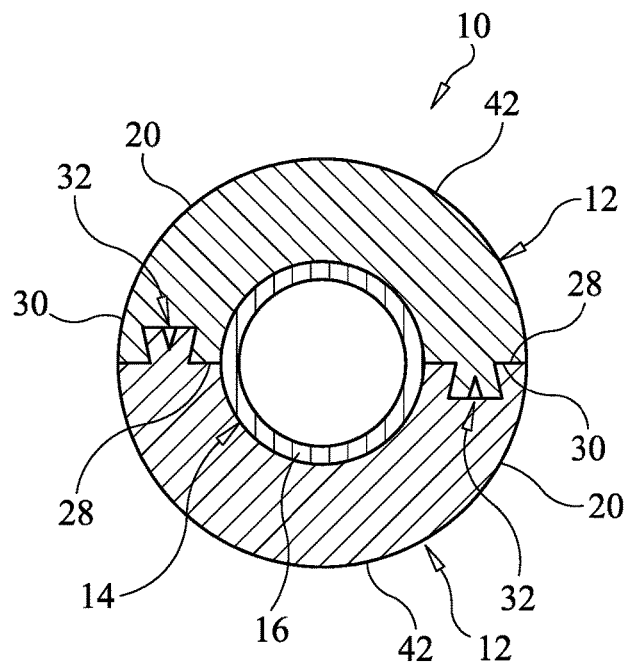
FIG. 1 is a transverse cross-sectional view of insulation in accordance with an embodiment of the invention arranged on a conduit.

Referring to FIGS. 1-4, there is shown insulation 10 in accordance with an embodiment of the invention. In this arrangement, the insulation 10 is for insulating conduits and similar tubular members. In the representatively illustrated embodiment, insulation 10 includes two separate, half-sleeve bodies 12, defining together an axially extending, cylindrically-shaped passage 14 for receiving a conduit 16 to be insulated. The bodies 12 are connected, in an interlocked manner by a tongue-and-groove coupling located at the abutting faces between the bodies.

Each half-sleeve body 12 is formed of a rigid foam insulation material, such as a rigid polyisocyanurate foam or a rigid polystyrene foam. The body 12 is cut or milled from the material and includes an exterior surface 20, an interior surface 22 that faces conduit 16, end surfaces 24 and 26, first and second connecting edge surfaces 28 and 30, respectively, and a semi-cylindrically shaped void extending along the interior surface.

Figure 2:
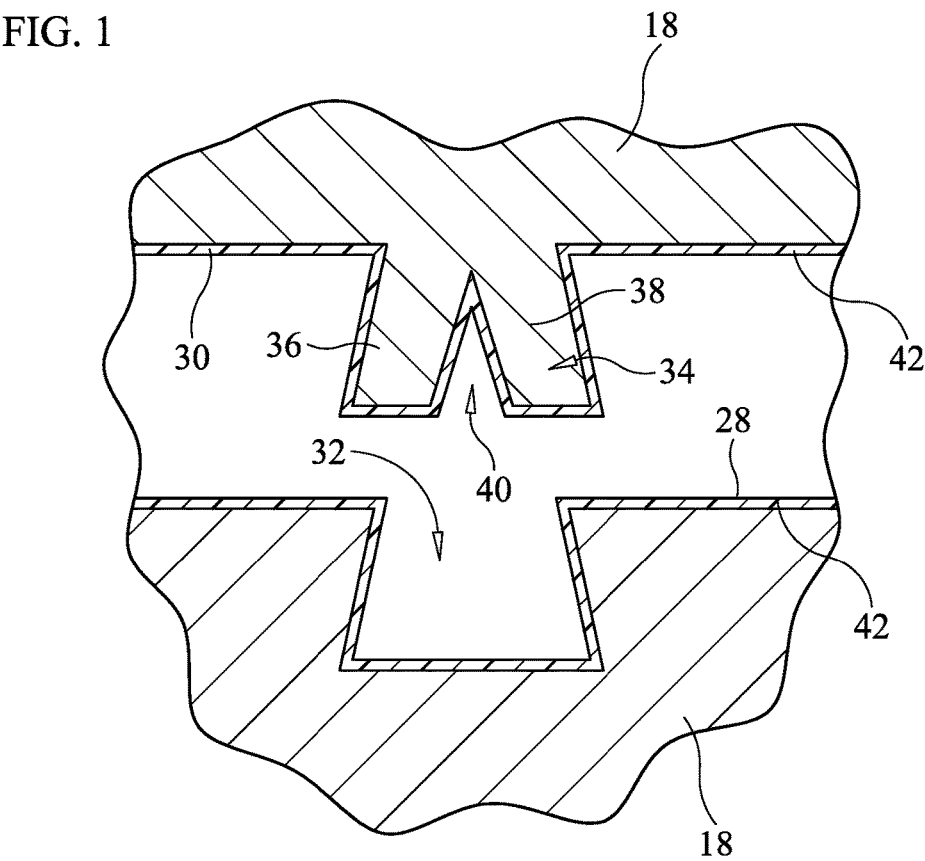
FIG. 2 is an enlarged, transverse cross-sectional view of a tongue-and-groove coupling of insulation in accordance with an embodiment of the invention.
Figure 3:
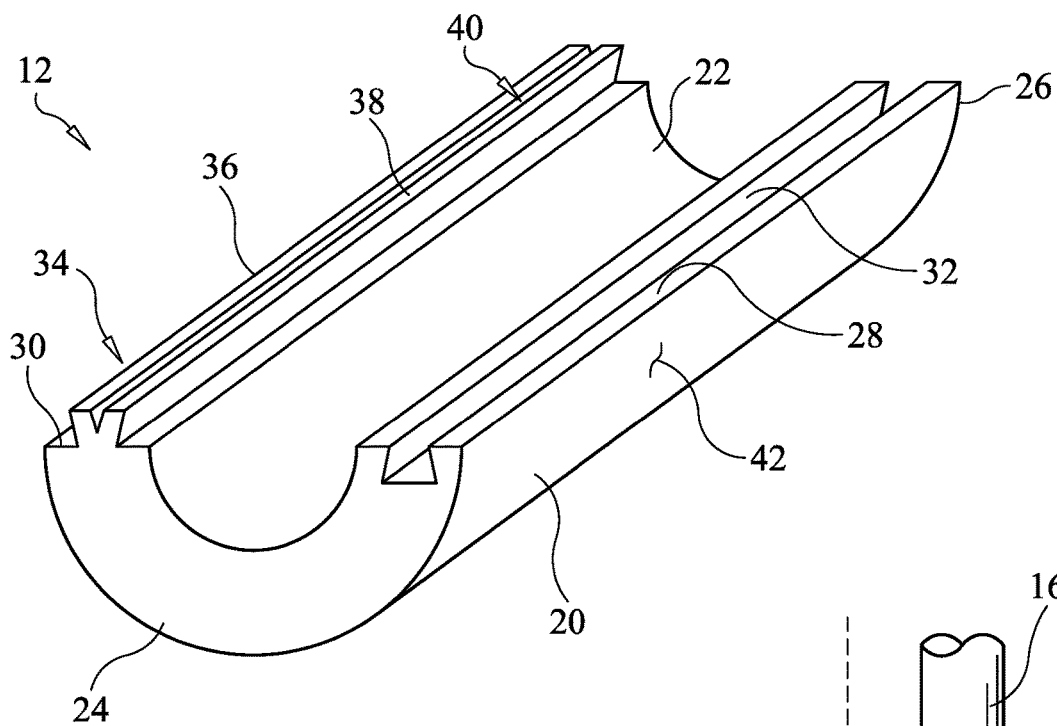
FIG. 3 is perspective view of insulation in accordance with an embodiment of the invention.
Figure 4:
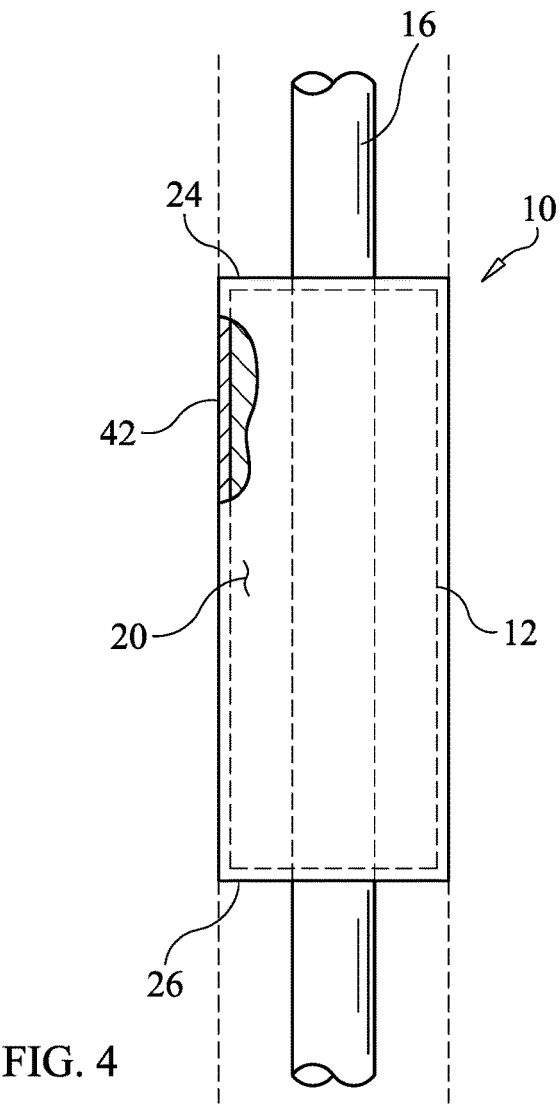
FIG. 4 is a side view of insulation in accordance with an embodiment of the invention arranged on a conduit.

In this embodiment, the bodies 12 have a generally identical construction, and comprise a groove 32 formed into the rigid foam material of the body along the first connecting edge surface 28. The groove 32, when viewed in a transverse cross-section, as best seen in FIG. 2, tapers from narrow to wide in a direction extending from its opening and into the body. In other words, the groove 32 is undercut to be narrow at its opening and then widen as it extends into the body. Further, each body 12 has a tongue 34 formed from the rigid foam material of the body along the second connecting edge surface 30. The tongue 34, when viewed in a transverse cross-section, tapers from wide to narrow in a direction toward the second connecting edge 30. In other words, the tongue is undercut to be wide at its top and then narrow toward the surface 30. The tongue 30 is bifurcated along its length into first and second ridges 36 and 38, by a wedge-shaped void 40.

As further shown, each body 12 is substantially coated in a polymer which forms an exterior, protective coating 42 on the body. Preferably, the polymer is polyurethane, polyurea, or a combination of polyurethane and polyurea that is spray coated on to the body 12 to form the protective coating 42. Suitable coating material include the Line-X coating product the XS coating products available from the Line-X corporation, for example. Coating 42 provides two functions. First, it protects the rigid foam material comprising the body 12 from impact damage and damage from environmental factors, including weather and animals. Additionally, coating 42 provides structural strength to the tongue 34, allowing the first and second ridges 36 and 38 to flex or pressed toward one another without breaking, which otherwise would break when flexed toward one another without the polymer coating.

When connecting the bodies 12 together, the structural support provided by coating 42 allows the ridges 36 and 38 of the tongue 34 of one body to be pressed toward one another to be removably inserted into the groove 32 of the other body in a snap-fit like engagement. By employing this engagement, the bodies are securely connected about the conduit 16.

Figure 5:
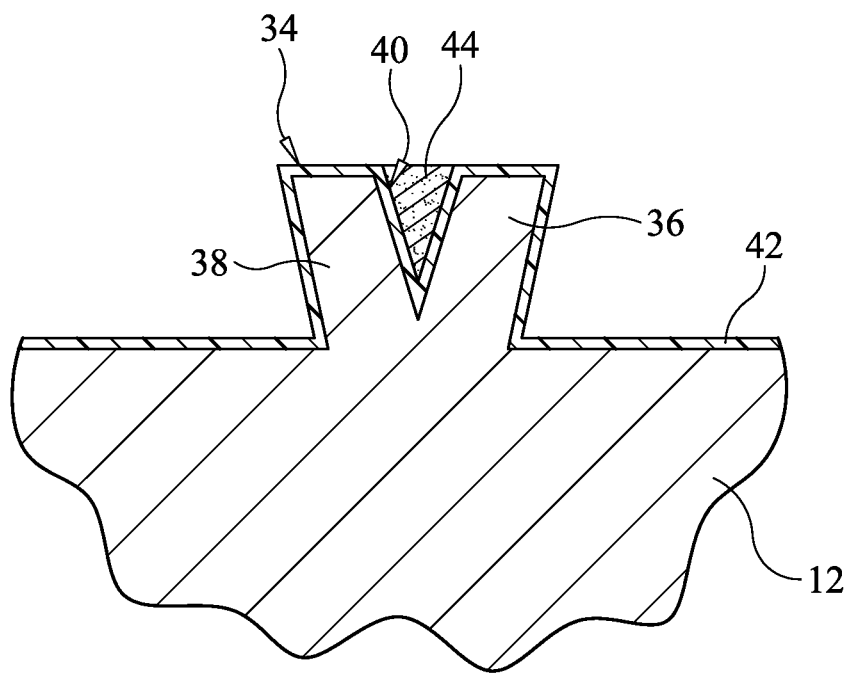
FIG. 5 is a partial, enlarge transverse cross-sectional view of a tongue of a tongue-and-groove coupling of insulation in accordance with an embodiment of the invention.

With reference to FIG. 5, in embodiments, the void 40 of the tongue 34 may be filled along its length with a compressible material 44, such as a compressible foam, to increase the insulation value of the tongue-and-groove coupling. For herein, a compressible material is a material than can have its volume reduced by a pressure applied to the material, but then once the pressure is removed the material returns to its initial shape. This allows the material 44 to compress when the ridges 36 and 38 are pressed toward one another and then expand when the ridges are in their relaxed state.

Figure 6:
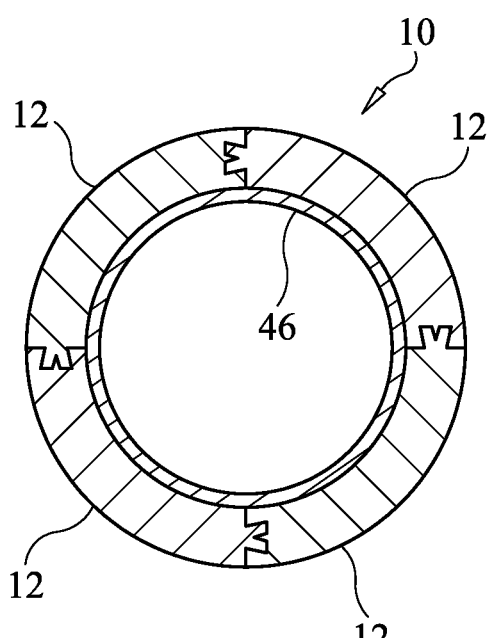
FIG. 6 is a transverse cross-sectional view of insulation in accordance with an embodiment of the invention arranged on a conduit.
Figure 7:
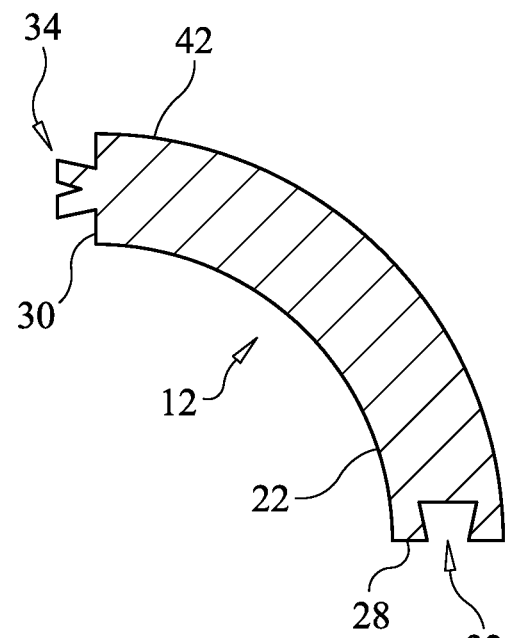
FIG. 7 is a transverse cross-sectional view of insulation in accordance with an embodiment of the invention.

With reference to FIG. 6, in embodiments where the insulation is used to insulate a pipe having diameters greater than 36-inches, more than two bodies 12 may be used. For example, as illustrated here, covering 10 includes four bodies 12 configured as quarter-shell sections that are connected about pipe 46. As shown in FIG. 7, each body 12, configured as a quarter-shell section, is constructed the same as the half-section body configuration discussed above. It should be further noted, that in very large pipe diameter applications, more bodies 12 may be used to cover the pipe.

In other embodiments, the insulation may have bodies formed into various geometrically shapes varying from simple panels to complex geometrically-shaped configurations, which are cut or milled from the rigid foam material. For example, in FIGS. 8 and 9, insulation 10 can comprises bodies 12 of rigid foam insulation that are configured as panels. While shown in a panel configuration in FIGS. 8 and 9, bodies 12 have a substantially similar construction as bodies 12 shown in FIGS. 1-4. Particularly, each panel-shaped body 12 includes first and second connecting edge surfaces 28 and 30, the groove 32, and the tongue 34 as previously described. And the bodies 12 are substantially covered by polymer coating 42 as also described above.

Several embodiments of the invention have been described. Nevertheless, those skilled in the art, having benefit of this disclosure, will appreciate that various modifications may be made without departing from the spirit and scope of the invention. Accordingly, other embodiments are within the scope of the appended claims.

What is claimed is:

1. An insulating member comprising:
    a body of rigid foam material having a first connecting edge surface and a second connecting edge surface;
    said body having a groove formed into said rigid foam material of said body along said first connecting edge surface, said groove, viewed in a transverse cross-section, tapering from narrow to wide in a direction extending from its opening and into said body;
    said body having a tongue formed from said rigid foam material of said body along said second connecting edge surface, said tongue, viewed in a transverse cross-section, being triangle-shaped with opposite planar sides, and tapering from wide to narrow in a direction toward said second connecting edge surface, said tongue being bifurcated along its length into first and second ridges by a wedge-shaped void that tapers from wide to narrow in a direction toward said second connecting edge surface;
    a polymer coating of polyurea or polyurethane substantially covering said tongue; and
    wherein said polymer coating structurally reinforcing said tongue allowing said first and second ridges to flex toward one another without breaking, which would otherwise break when flexed toward one another without said polymer coating.

2. The insulating member of claim 1, wherein said rigid foam material is a rigid polyisocyanurate foam or rigid polystyrene foam.

3. The insulating member of claim 1, wherein said polymer coating substantially covers and encapsulates said body.

4. The insulating member of claim 1, wherein said body is semi-cylindrically shaped and has an exterior surface, an interior surface, end surfaces, and said first and second connecting edge surfaces, said body further having a semi-cylindrically shaped void extending along said interior surface for receiving a conduit therein.

5. The insulating member of claim 1, further comprising a compressible material located within and along the length of said wedge-shaped void.

6. A conduit insulating covering comprising:
    a first body and a second body, each made of a rigid foam material and having an exterior surface, an interior surface, end surfaces, first and second connecting edge surfaces, and a semi-cylindrically shaped void extend along said interior surface, and when coupled together said semi-cylindrically shaped voids define a cylindrically-shaped void for receiving a conduit therein;
    each of said first and second bodies having a groove formed into said rigid foam material of said body along said first connecting edge surface, said groove, viewed in a transverse cross-section, tapering from narrow to wide in a direction extending from its opening and into said body;

each of said first and second bodies having a tongue formed from said rigid foam material of said body along said second connecting edge surface, said tongue, viewed in a transverse cross-section, being triangle-shaped with opposite planar sides, and tapering from wide to narrow in a direction toward said second connecting edge, said tongue being bifurcated along its length into first and second ridges by a wedge-shaped void that tapers from wide to narrow in a direction toward said second connecting edge surface;

wherein at least said tongue of each of said first and second bodies being substantially coated in polymer coating of polyurea or polyurethane, said polymer coating structurally reinforcing said tongue allowing said first and second ridges to flex toward one another without breaking, which would otherwise break when flexed toward one another without said polymer coating; and wherein said tongue of said first body is removably receivable by said groove of said second body in a snap-fit engagement and said tongue of said second body is removably receivable by said groove of said first body in a snap-fit engagement.

7. The conduit insulating covering of claim 6, wherein said rigid foam material is a rigid polyisocyanurate foam or rigid polystyrene foam.

8. The conduit insulating covering of claim 6, wherein each of said first and second bodies are substantially covered by said polymer coating.

9. The conduit insulating covering of claim 6, further comprising further comprising a compressible material located within and along the length of each wedge-shaped void.

10. Rigid foam insulation comprising:

a first insulating a body formed of a rigid foam material, said first insulating body having a first connecting edge surface and a groove formed into said rigid foam material of said first body along said first connecting edge surface, said groove, viewed in a transverse cross-section, tapering from narrow to wide in a direction extending from its opening and into said body;

a second insulating body formed of a rigid foam material, said second insulating body having a second connecting edge surface and a tongue formed from said rigid foam material of said second insulating body along said second connecting edge surface, said tongue, viewed in a transverse cross-section, being triangle-shaped with opposite planar sides, and tapering from wide to narrow in a direction toward said second connecting edge, said tongue being bifurcated along its length into first and second ridges by a wedge-shaped void that tapers from wide to narrow in a direction toward said second connecting edge surface;

said first and said second insulating bodies being substantially coated in a polymer coating of polyurea or polyurethane, wherein said polymer coating structurally reinforcing said tongue allowing said first and second ridges to flex toward one another without breaking, which would otherwise break when flexed toward one another without said polymer coating; and said first and said second insulating bodies being removable connected by inserting said tongue into said groove.

11. The rigid foam insulation of claim 10, wherein said rigid foam material of said first and said second insulating bodies is a rigid polyisocyanurate foam or rigid polystyrene foam.

12. The rigid foam insulation of claim 10, further comprising further comprising a compressible material located within and along the length of each wedge-shaped void.

* * * * *